(12) United States Patent　　(10) Patent No.: US 7,827,663 B2
Cook et al.　　(45) Date of Patent: Nov. 9, 2010

(54) PIPE JOINER

(76) Inventors: Robert D Cook, P.O. Box 275, Cheshire, OR (US) 97419-0275; Thomas H Kessler, 4290 High St., Eugene, OR (US) 97405

( * ) Notice: Subject to any disclaimer, the term of this patent is extended or adjusted under 35 U.S.C. 154(b) by 121 days.

(21) Appl. No.: 11/805,516

(22) Filed: May 22, 2007

(65) Prior Publication Data

US 2008/0010799 A1　　Jan. 17, 2008

Related U.S. Application Data

(63) Continuation-in-part of application No. 11/485,497, filed on Jul. 11, 2006, now Pat. No. 7,523,533.

(51) Int. Cl.
*B23P 19/04*　　(2006.01)

(52) U.S. Cl. .............................. 29/244; 29/267; 29/278
(58) Field of Classification Search ................... 29/244, 29/267, 268, 278
See application file for complete search history.

(56) References Cited

U.S. PATENT DOCUMENTS 3,653,115 A * 4/1972 Perkins ......................... 29/237
4,493,139 A * 1/1985 McClure ....................... 29/267
4,748,730 A * 6/1988 George ......................... 29/237

* cited by examiner

*Primary Examiner*—David P Bryant
*Assistant Examiner*—Christopher M Koehler
(74) *Attorney, Agent, or Firm*—FSP LLC

(57) ABSTRACT

A pipe gripper includes an adjustable throat for receiving a pipe and a bore having an unbroken inner circumference that exceeds 180 degrees.

4 Claims, 4 Drawing Sheets

PIPE JOINER

PRIORITY CLAIM

The present application claims priority as a continuation in part utility application corresponding to subject matter of utility patent application PIPE JOINER, having application Ser. No. 11/485,497, filed on Jul. 11, 2006.

TECHNICAL FIELD

The present disclosure relates to pipe joining.

BACKGROUND

Many types of pipe, including bell socket pipe, are laid in sections. These sections must be joined in the field, which may prove a difficult proposition due to large pipe diameters and rough terrain, among other factors. Conventional manners of joining pipe have proven inadequate or cumbersome.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

Pipe Joining Apparatus

Figure 1:
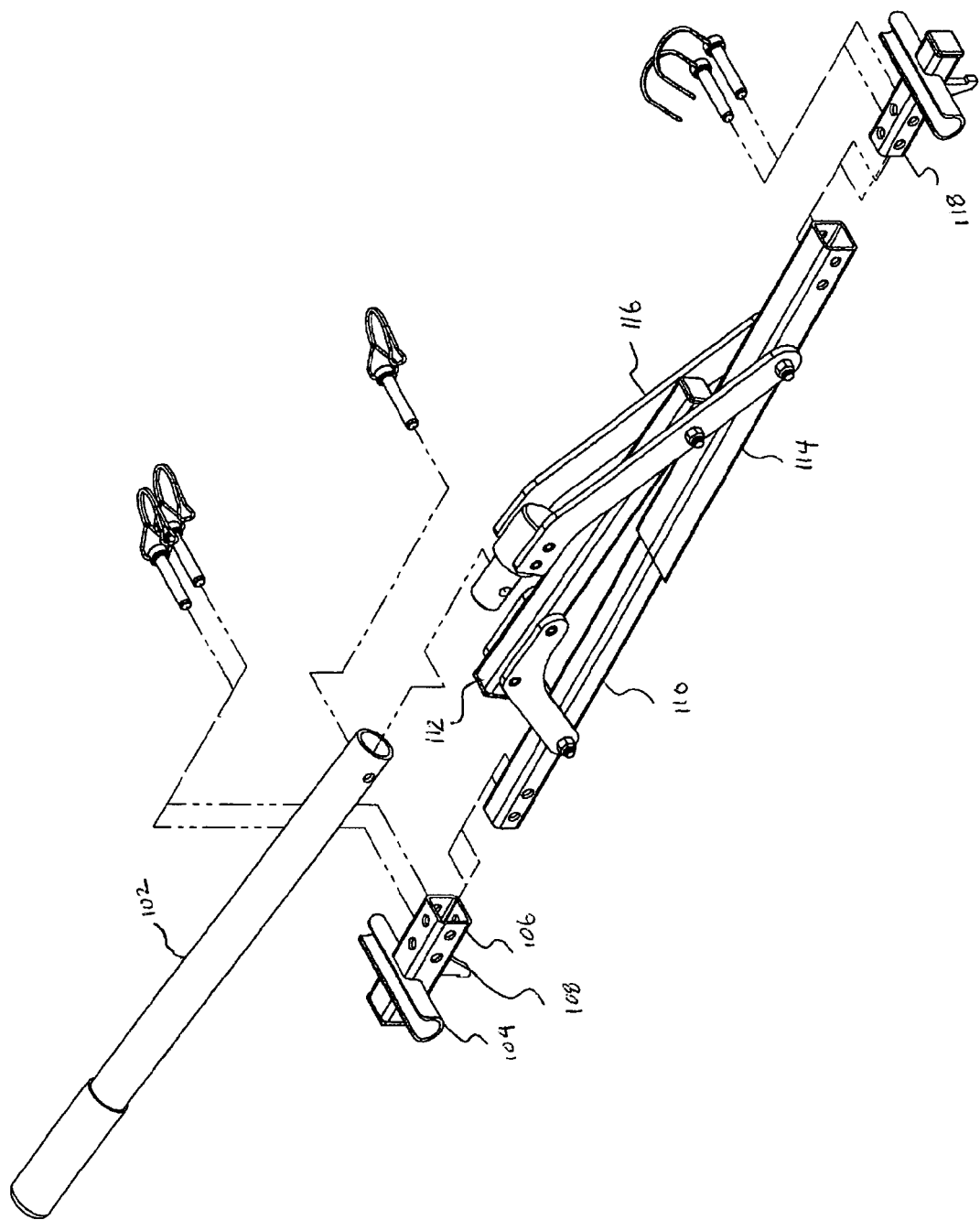
FIG. 1 is an illustration of an embodiment of a pipe joining apparatus.

FIG. 1 is an illustration of an embodiment of a pipe joining apparatus.

Power and Frame

The pipe joiner includes a power assembly 112 and 116, a first attachment retainer 106 and a second attachment retainer 118, each retainer configured to accept a pipe claw or other attachment, and a frame 110 and 114 supporting the first and second attachment retainers 106 and 118. Each retainer 106 and 118 includes an attachment piece (104 for retainer 106) into which a piece, such as a pipe claw, may be placed. A pipe claw (see FIG. 2) or other attachment may be used to secure a pipe section during a pipe joining operation. The power assembly 112 and 116 is coupled to the frame 110 and 114 in such a manner that operating the power assembly 112 and 116 draws the retainers 106 and 118 toward one another.

The retainers 106 and 118 and the frame 110 and 114 include holes such that a retainer 106 or 118 may be attached to a frame 110 or 114 by pins (two are shown for each retainer as illustrated) which passes through the holes. The rod or rods may comprise pins, or may constitute a bolt and may be held in place by a nut, among other possibilities. As illustrated, there may be various holes in the retainers 106 118 enabling them to be attached to the frame 110 114 such that the pipe claw or other attachment is oriented in varying manners with respect to the frame.

The frame may include first and second telescoping sections 110 and 114. Some embodiments may comprise sections which slide side by side, or even sections which fold with respect to one another. In some embodiments, sections that slide may have one section that is partially enclosed by another. For example, one section may have an attached rail, where the sides of the rail slide within the other section or something attached to the other section. As shown, there are two sections 110 and 114 used in a telescoping action. However, telescoping and or side by side sliding designs may include more than two sections. Embodiments including more than two sections may incorporate both telescoping and side by side sliding design, and/or folding action.

The power assembly may be manual, manual-assist, or fully powered. One example of a manual assembly, preferably for small diameter pipe, is shown in FIG. 1. A lever arm 116 is pivotally coupled to a drive shaft 112, with the drive shaft 112 coupled to a first section 110 of the frame, and the lever arm 116 coupled to a second section 114 of the frame. A handle 102 is attached to the lever arm 116 using holes/pins (may be bolts and nuts or other attachment mechanism). When the handle 102 is pulled upward away from the frame the lever arm 116 creates a force to draw the frame sections 110 and 114 together.

The retainers 110 and 118 are also drawn together. Attachment pieces (such as pipe claws), secured by the retainers 106 118 are also drawn together. Because the pipe sections are sitting within the pipe claws, they are "grabbed" by flexing of the pipe claws away from one another, and drawn together.

Fully-powered or power-assisted embodiments may include at least one of a pneumatic, electric, or hydraulic assembly. Other manual-type power assemblies may include a ratchet assembly and/or a gear assembly, and/or a jackscrew and nut assembly.

In manual modes, a removable handle 102 may be included, as illustrated, to extend the leverage of the power assembly.

Attachment Retainers

The pipe joiner includes assembly retainers 106 and 118 to secure the pipe grip attachments. The pipe grip attachments may comprise pipe claws as illustrated if FIG. 2.

Each retainer 106 118 is formed to removably attach to the frame in different orientations. This enables the openings of the pipe claws, or whatever attachment is used, to be employed in different orientations to facilitate field operation.

Square-section framing may be used. In that case each retainer 106 118 may be formed to attach to the frame in up to four orientations as illustrated. In other embodiments, fewer or additional orientations may be enabled. For example, hexagonal cross sectional framing may be employed to provide up to six orientations for the attachments.

A stop 108 may be included near each retainer to inhibit inward flexing of the pipe claw when the retainers 106 118 are drawn apart. In some situations it may be advantageous to "pump" the pipe joiner to effect a joining of pipe sections. In these situations, as the attachments are drawn apart they may bite down on the pipe and pull it apart, unless the stops 108 are employed to prevent biting.

The retainers may include at least one groove, ring, or rod 104 into which a handle of the pipe claw may slide. For example, FIG. 1 shows how a 'half-pipe' may be employed so that a rod-shaped attachment handle may slide easily into position.

Operation

Joining of pipe, for example pressure fitting one pipe into the flared (belled) end of another, may be accomplished by sliding a first section of pipe into a recess in a first attachment (e.g. a pipe claw), sliding a second section of pipe into a recess in a second attachment (e.g. another pipe claw), and then applying force via the power assembly to urge the two attachments toward one another. Urging the attachments toward one another causes each attachment to flex away from the other, in turn causing edges of each attachment to bite down and secure onto the pipe sections. Force is continually applied in this manner to urge the pipe sections together.

In some situations, a single operation of the power assembly will be insufficient to full join the pipe. In these situations, the pipe joiner may be "pumped". If the pipe joiner is fully manual, this may occur by moving the handle 102 up and then down one or more times. The down action of such pumping results in the application of a reverse force to urge the attachments away from one another. This causes the attachments to flex toward one another. The attachments will bite into the pipe if allowed to flex too far, and the reverse force will then operate to pull the sections of pipe apart. To inhibit this from occurring, flexing of the attachments toward one another is inhibited (e.g. by the stops 108) at a point that enables the attachments slide along the sections of pipe (e.g. when they attachments are substantially perpendicular with the pipe). The attachments then slide away from one another without biting down and securing onto the sections of pipe and pulling the sections apart.

Pumping may proceed by continuing to apply force to urge the pipe sections together, and applying reverse force, alternately, until the pipe sections are joined.

Attachment for the Pipe Joining Apparatus of FIG. 1

Figure 2:
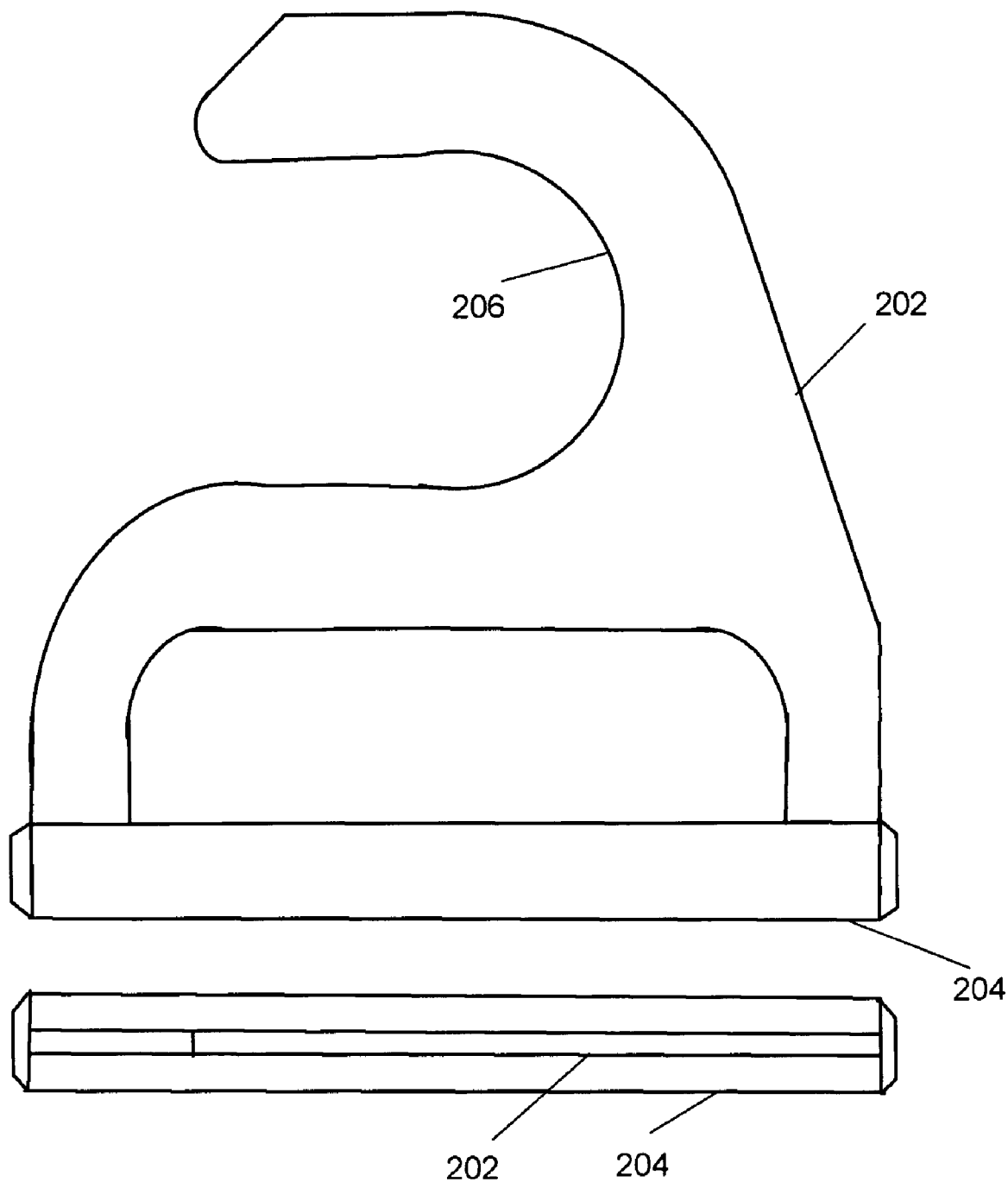
FIG. 2 is an illustration of an embodiment of an attachment for the pipe joining apparatus of FIG. 1.

FIG. 2 is an illustration of an embodiment of an attachment for the pipe joining apparatus of FIG. 1. Such an attachment may be referred to as a 'pipe claw'. The pipe claw constitutes a hook 202 having an opening 206 into which a pipe may be placed. The hook 202 also attaches to a pipe claw handle 204. FIG. 2 provides a side view and a top view of the pipe claw.

In one embodiment the pipe joiner employs at least two pipe claws. Each pipe claw includes a handle 204 and a hook 202, with the sweep 206 of the hook 202 sized to fit a diameter of a section of pipe.

The handle 204 of each pipe claw may be formed to slide into the retainers 106 118 of the pipe joiner, and to rotate into a locked position. For example, the handle 204 may be formed from a rod and fitted into a 'half-pipe' 104 of the retainer. The claw may then be rotated into a locked position by rotating the hook 202 so that the claw cannot slide out of the retainer during operation. If the hook 202 may be considered to be facing up or to be above the pipe joiner frame when the handle 204 is inserted into the half-pipe 104, the hook 202 may be rotated around the end of the frame such that it winds up when locked facing down, i.e., the hook 202 may be rotated 180 degrees to lock it into position for operation so that it cannot slide sideways out of the half-pipe 104.

The hook 202 may be formed from a thin strong section of metal including an opening 206 to receive the section of pipe, the opening 206 having edges to bite down on the section of pipe when the pipe claw is flexed.

Figure 3:
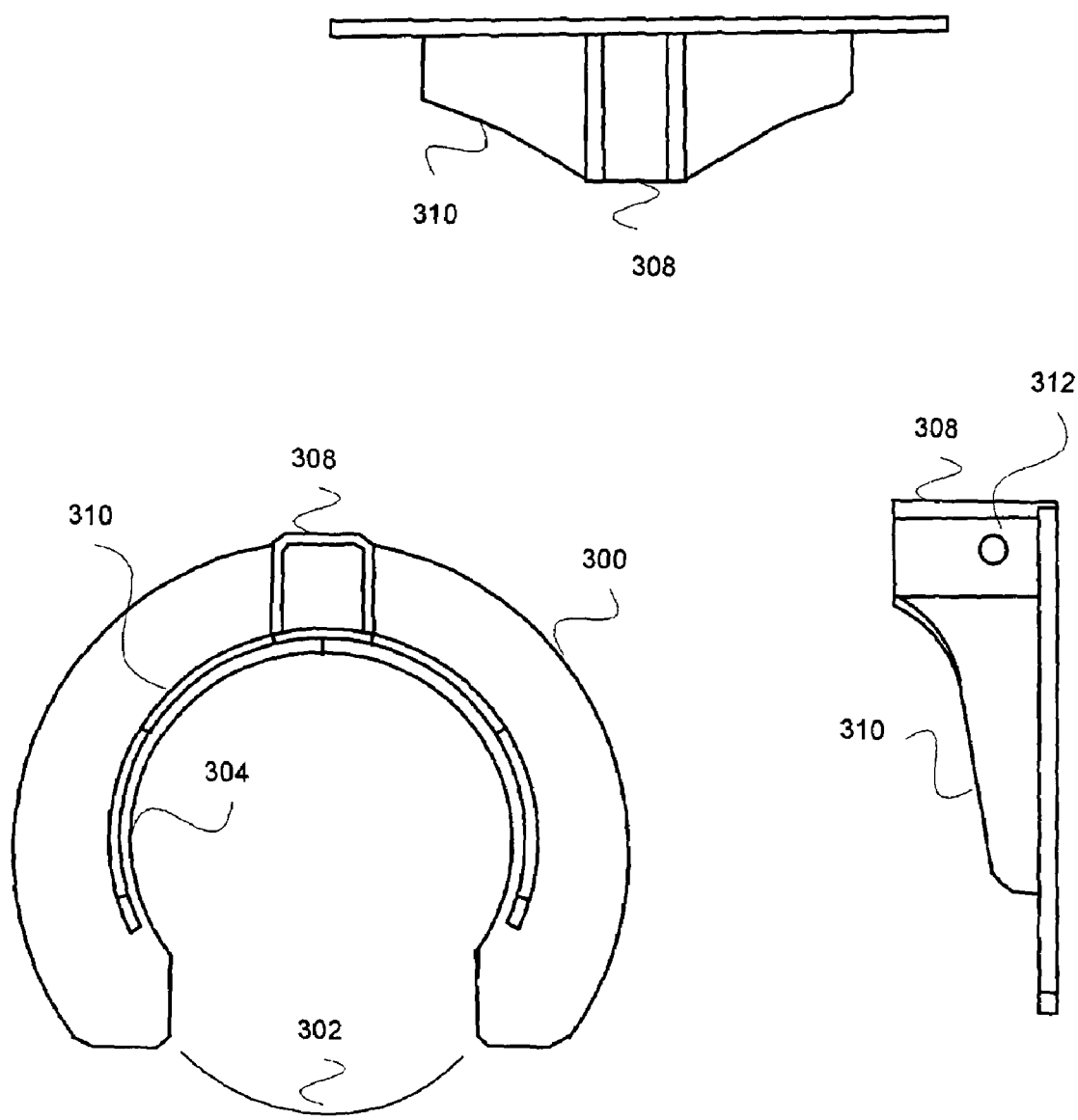
FIG. 3 is an illustration of top, side, and front views of an embodiment of a pipe 'yoke'.

FIG. 3 is an illustration of top, side, and front views of an embodiment of a pipe yoke 300.

Pipe Yoke

The yoke 300 comprises a roughly circular formation, typically metal, which may mount on one end of the frame 110 and 114. The yoke 300 is designed to engage securely with the bell (flared) portion at the end of a pipe. The yoke 300 has a specifically shaped and sized inner diameter 304. The inner diameter 304 (also called the bore) and the width of the opening 302 (also called the throat) are selected to provide improved engagement with different pipe dimensions.

In operation the throat 302 of the yoke 300 may admit the pipe into the bore 304. The bore 304 may then slide along the length of the pipe, urged by operation of the power assembly 114 and 116, until securely engaging with the bell end of the pipe.

Different embodiments of bore 304 and throat 302 for different types of pipe (Cast Iron Pipe Sizes, Iron Pipe Sizes, Sewer Pipe Sizes, and Electrical Conduit) are listed in the table below. These are only examples and actual dimensions may not necessarily be limited to one or more of these values:

| Pipe Type | Bore (inches) | Throat (inches) | Offset (inches) |
| --- | --- | --- | --- |
| C-4 | 5.849 | 4.894 | 3/8 |
| C-6 | 7.937 | 6.994 | 3/8 |
| C-8 | 10.310 | 9.144 | 1/2 |
| C-10 | 11.497 | 11.132 | 3/4 |
| C-12 | 13.637 | 13.387 | 3/4 |
| I-4 | 5.115 | 4.594 | 3/8 |
| I-6 | 7.435 | 6.719 | 3/8 |
| I-8 | 9.607 | 8.719 | 1/2 |
| I-10 | 11.110 | 10.782 | 3/4 |
| I-12 | 13.155 | 12.937 | 3/4 |
| S-4 | 4.353 | 4.247 | 3/8 |
| S-6 | 6.478 | 6.307 | 3/8 |
| S-8 | 8.668 | 8.462 | 1/2 |
| S-10 | 10.804 | 10.562 | 3/4 |
| S-12 | 12.860 | 12.562 | 3/4 |
| E-4 | 4.755 | 4.625 | 3/8 |
| E-5 | 5.856 | 5.688 | 3/8 |
| E-6 | 6.950 | 6.750 | 3/8 |

In the table, the following designations apply:
1. "C" designates Cast Iron Pipe Size
2. "I" designates Iron Pipe Size
3. "S" designates Sewer Pipe Sizes
4. "E" designates Electrical Conduit The offset is a clearance figure designed into the yoke 300 to provide suitable distance between the outside diameter of a pipe and the bottom of the puller frame 110 and 114 while engaging the pipe. This clearance may prevent the puller frame 110 and 114 from contacting a gasket race molded into the pipe, typically at the bell end.

In the embodiments shown in the table above, the bore 304 and the throat 302 may have tolerances of +0.020 and −0.000. The relative dimensions of the bore 304 and throat 302 enable the bore 304 to have an inner unbroken circumference that exceeds 180 degrees, which in turn provides for more effective engagement with the bell end of a pipe.

In some embodiments involving pipes with outer diameters that are 8 inches and smaller, the bore 304 may be the actual pipe outer diameter, plus 0.062 inches, with a tolerance of +0.020 inches and −0.000 inches. In some embodiments involving pipes with outer diameters that are 10 inches and larger, the bore 304 may be the actual pipe outer diameter, plus 0.125 inches, again with a tolerance of +0.020 inches and −0.000 inches. The actual bore may vary in other embodiments, and/or may vary somewhat from the sizes and tolerances shown in the table.

The yoke 300 may include a flange 310 to provide strength and stability, and to support a retainer 308 that may engage the yoke 300 with an end of the frame 110 and 114. The retainer 308 may include a hole 312 through which a pin may be fitted to secure the yoke 300 with the frame 110 and 114.

Thus, the yoke 300 may be fitted to one end of a pipe joining apparatus, for example the apparatus of FIG. 1, in order to engage the one of two pipes to join that comprises a bell (flared end). The other of the two pipes to join may be engaged by a 'pipe claw', for example as shown in FIG. 2, or by a pipe 'talon', as described more fully in conjunction with FIG. 4.

Figure 4:
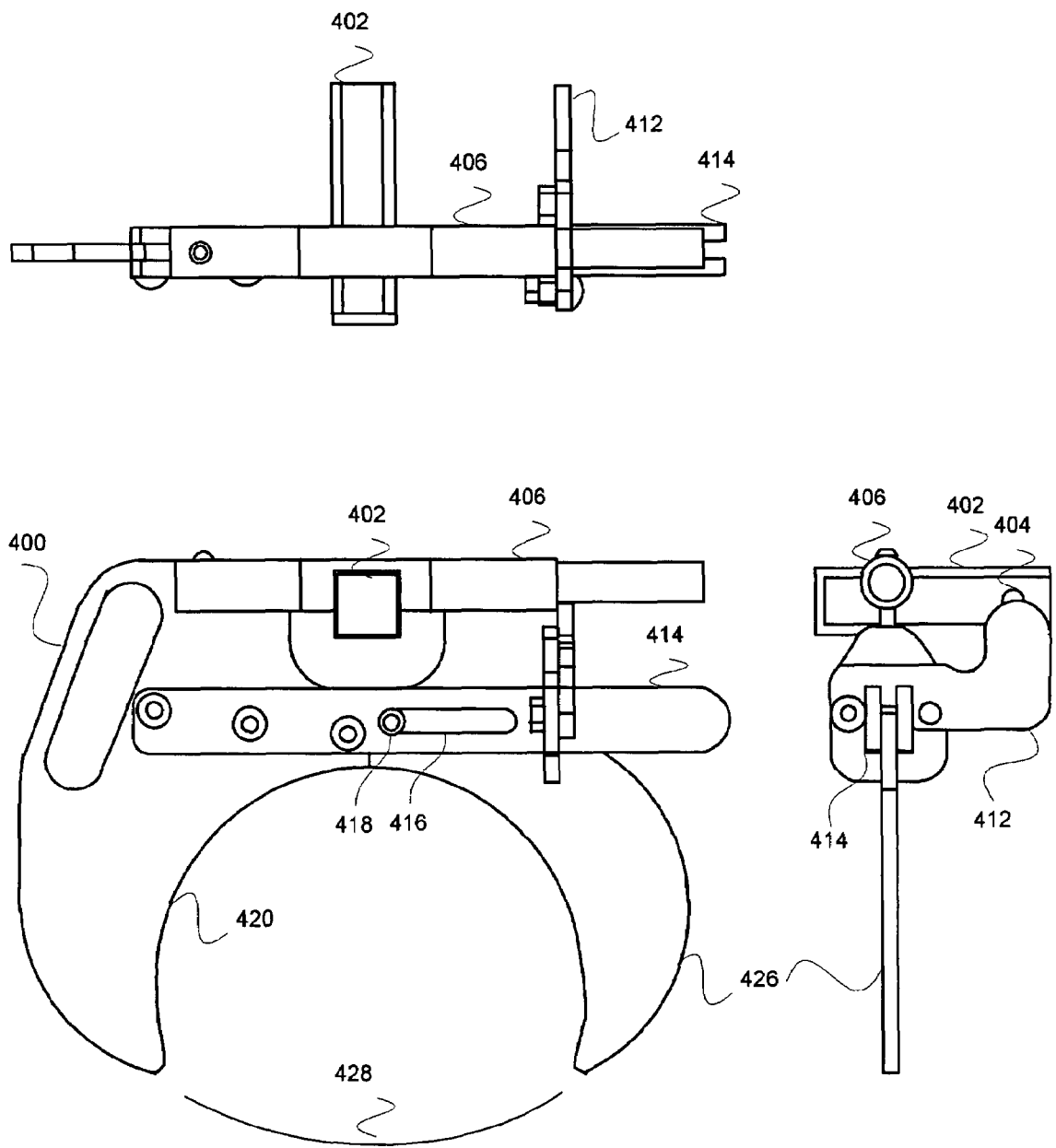
FIG. 4 is an illustration of top, front, and side views of an embodiment of a pipe 'talon'.

FIG. 4 is an illustration of top, front, and side views of an embodiment of a pipe 'talon' 400.

Pipe Talon

The talon 400 comprises a body that in some embodiments may be formed from heavy sheet steel or other metal. The talon 400 is similar to the claw in some respects, for example in the manner in which it may flex and engage with pipe body as a pipe joiner to which it is affixed is operated. However, the talon 400 may in some cases be fitted more easily over the pipe body, for example from above without clearing out dirt or other obstructions below the pipe. Furthermore, the talon 400 may be adjusted so that the throat 428 that receives the pipe may be varied.

The talon 400 may be affixed with the frame 110 and 114 of a pipe joiner via a retainer 402 that receives (or is received by) the frame, and secured via a pin through a hole 404, or via other conventional mechanisms that will be apparent to those skilled in the art. The upper slide 406 may pass through a notch 410 in the retainer 402, providing additional support and stability to the talon 400.

The talon 400 may comprise a body 426 having two parts, each part joined with a portion of an upper slide 406 and a lower slide 414. The upper and lower slides 406 and 414 provide stability and enable the two parts of the body 426 to be separated, the body of a pipe received into the bore 420, and the two parts of the body 426 brought back together again. The bore 420 may have an inner unbroken circumference that exceeds 180 degrees, and may even approach 270 degrees in some embodiments, providing, once the two body parts are brought together again, superior engagement with the body of a pipe as compared to what may be achieved utilizing a claw.

The throat 428 may have a width less than the outer diameter of the pipe to engage. By sliding the parts of the body 426 apart, receiving the pipe into the bore 420, and closing the parts of the body 426 together again, the pipe may be firmly engaged within the talon 400.

In some situations it may be possible to use one talon 400 with different sizes of pipe; however, for the most efficient and reliable operation, different sized talons may be employed for pipes having different outer diameters. Typically, a talon 400 and a yoke 300 that are used to join sections of pipe will both be sized appropriately for the outer diameter of the pipe sections to join.

A slide limiting stop 418 (e.g. a bolt or other stop) affixed to one part of the body 426 through an aperture 416 in the lower slide 414 may limit the extent of separation of the two body parts, for example so that they are not inadvertently entirely disengaged from one another. A pivoting retaining latch 412 engages with notches 430 (depressions, variations, etc.) in one part of the body 426 to retain the body parts together once the talon is closed over a section of pipe. Those skilled in the art will recognize that this is only one possible manner of retaining the parts of the body 426 in the closed position.

What is claimed is:

1. A pipe joiner comprising:
   a nonadjustable grip at a first end, the nonadjustable grip having a bore with an inner circumference that exceeds 180 degrees;
   an adjustable grip at a second end, the adjustable grip having a bore with an inner circumference that exceeds 180 degrees; and
   a first attachment retainer and a second attachment retainer, each retainer configured to accept a pipe claw; and
   a retainer for the adjustable grip formed to allow the adjustable grip to flex substantially outward against a pipe received in the adjustable grip when the nonadjustable and adjustable grips are drawn toward one another, and to inhibit inward flexing of the adjustable grip against the pipe when the nonadjustable and adjustable grips are drawn apart from one another.

2. The joiner of claim 1 further comprising:
   a flange formed around a circumference of the bore of the nonadjustable grip.

3. The joiner of claim 1, further comprising:
   a mechanism to urge the first and second ends together.

4. The joiner of claim 1, further comprising:
   a slide to which two sections of the adjustable grip are coupled and by which the two sections may be translated apart from one another.

* * * * *